United States Patent [19]

Stoll

[11] Patent Number: 4,696,388
[45] Date of Patent: Sep. 29, 1987

[54] CONVEYOR BELT SCRAPER BLADE ASSEMBLY WITH CONTOURED SURFACE

[75] Inventor: Donald L. Stoll, Huntington, W. Va.

[73] Assignee: Richwood Industries, Inc., Huntington, W. Va.

[21] Appl. No.: 804,215

[22] Filed: Dec. 3, 1985

[51] Int. Cl.$^4$ ............................................. B65G 45/00
[52] U.S. Cl. ..................................... 198/493; 198/499
[58] Field of Search ............... 198/497, 499, 599, 635, 198/637; 15/236 A, 245, 256.5, 256.51, 256.6; 474/92

[56] References Cited

U.S. PATENT DOCUMENTS 4,402,394 9/1983 Stoll .................................... 198/499

FOREIGN PATENT DOCUMENTS 975525 11/1982 U.S.S.R. .............................. 198/499

Primary Examiner—James B. Marbert
Attorney, Agent, or Firm—Biebel, French & Nauman

[57] ABSTRACT

A conveyor belt scraper blade assembly having an elongate blade body made of a resilient material and having a longitudinally-extending belt scraping surface, a frame attached to the body which imparts a convex shape to the belt scraping surface, and a pair of brackets mounted on the ends of the body for attaching the blade assembly to supporting structure. In a preferred embodiment, the blade body includes a central longitudinal slit and the frame includes an insert having a double convex shape which is fitted within the slit. The frame further includes a pair of opposing side walls which are attached to the insert and include a plurality of inwardly-directed prongs which engage the blade body and hold the body in position relative to the insert.

10 Claims, 4 Drawing Figures

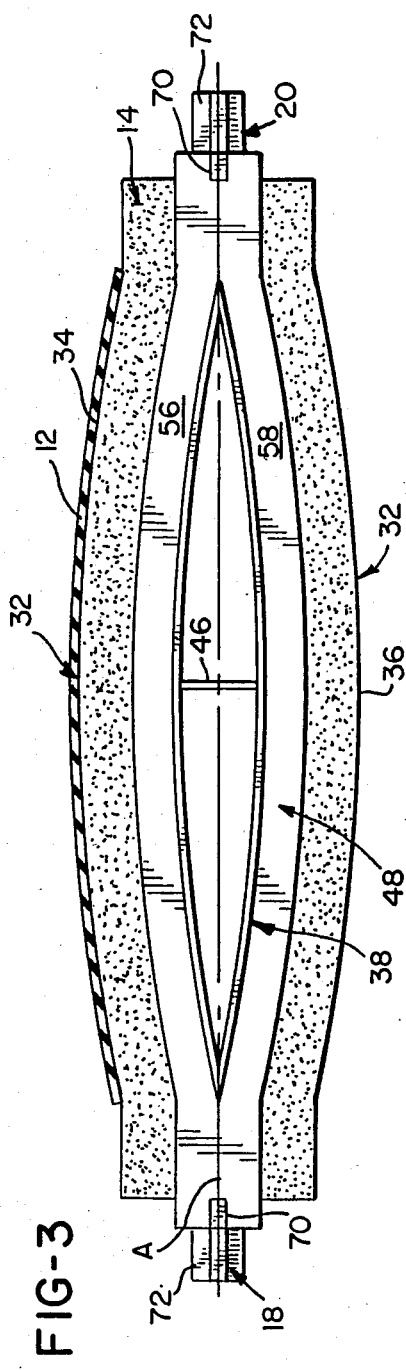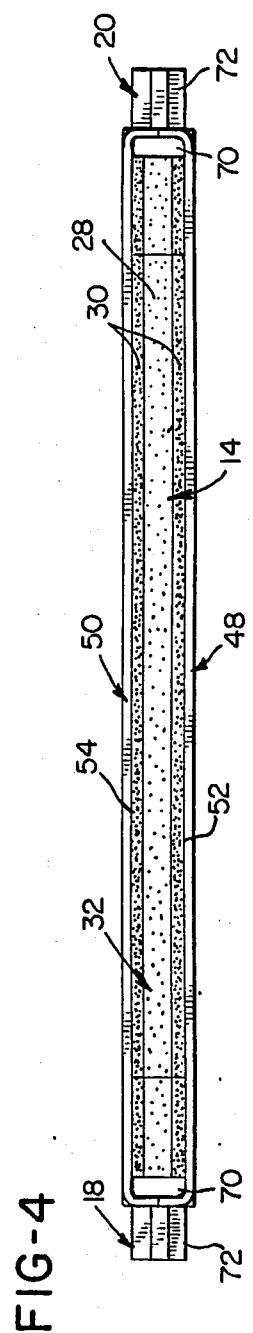

CONVEYOR BELT SCRAPER BLADE ASSEMBLY WITH CONTOURED SURFACE

BACKGROUND OF THE INVENTION

The present invention relates to conveyor belt scraper blade assemblies and, more particularly, to scraper blade assemblies adapted to clean older conveyor belts.

Conveyor belt assemblies of the type having a flexible, endless belt are frequently used in mining operations to convey abrasive, particulate material. After long periods of use, the flexible belt, which may be a fabric coated with rubber or polyvinyl chloride, tends to stretch and wear such that the load-carrying surface of the belt assumes a concave contour across its width. This occurs in part because such belt systems employ troughed idlers to support the belt so that it has a concave shape in use to concentrate the load in the middle of the belt. This troughing effect causes the belt fabric to stretch along its middle.

When such belts are used to carry particulate material which may be wetted, accumulations of material build up on the belt. Such accumulations are removed by conveyor belt scrapers such as that shown in Stoll U.S. Pat. No. 4,402,394, which is commonly assigned. Such conveyor belt scrapers include one or more scraper blades, each having an elongate scraping blade surface which is urged into contact with the load-carrying surface of the conveyor belt, preferably on a return run of the conveyor apparatus. The scraping surfaces of such blades are generally flat in shape, and therefore are unable to conform to the concave contour of a worn conveyor belt in order to remove accumulations of material from the central portion of the belt.

Attempts have been made to develop conveyor belt scrapers which are capable of conforming to the contour of the conveyor belt. Such an apparatus is exemplified by the blade shown in Matson U.S. Pat. No. 3,504,786. That patent shows a conveyor belt scraper assembly which comprises a plurality of scraper blade segments which are mounted on the ends of rods attached to a bar spanning the width of the conveyor belt and mounted on a support which rotates the bar to urge the blades into contact with the belt. The blade segments are each sized and positioned to extend across only a part of the belt, and the rods are sufficiently flexible so that the blade segments are individually biased to engage an associated part of the belt, whether the belt is substantially flat in contour or has a convex shape.

A disadvantage with such designs is that the large number of parts required to fabricate such an assembly results in an increased cost of production and high maintenance costs. Furthermore, the use of individual blade segments which are urged into the load-carrying surface of the belt by resilient rods often results in the "chattering" of the blade segment, during which it bounces into and out of contact with the belt surface. This substantially reduces the efficiency of the blade scraper since the individual scraper elements are in contact with the load-carrying surface on a less-than-constant basis during use.

Accordingly, there is a need for a conveyor belt scraper blade assembly which is capable of conforming to the concave contour of a worn conveyor belt, and which is relatively low-cost and does not have a high maintenance requirements. There is also a need for a conveyor belt scaper blade assembly which reduces the likelihood of blade chatter, and therefore increases the efficiency of material removed.

SUMMARY OF THE INVENTION

The present invention is a conveyor belt scraper blade assembly which utilizes a continuous blade body having a concave shape which matingly engages the convex shape of the worn conveyor belt. The blade assembly includes an elongate blade body made of a resilient material and having a longitudinally-extending belt scraping surface, a frame attached to the body for imparting a convex shape to the belt scraping surface, and brackets attached to the ends of the frame which are adapted to be attached to a suitable supporting structure.

In a preferred embodiment of the invention, the scraping surface consists of a pair of continuous surface portions positioned on opposing longitudinal sides of the blade body, and the blade body includes a central, longitudinally-extending slit. The frame includes an insert having a double convex shape which is inserted into the slit. The double convex shape of the insert imparts a convex contour to both of the surface portions of the blade body.

The frame also includes a pair of side bars which extend along the outer side walls of the blade body and are attached to the insert. The side panels include a plurality of inwardly-directed prongs which engage the blade body and hold it in position relative to the insert. The brackets are attached to the ends of the side panels and are shaped such that the blade body may be positioned to place either of the two surface portions into contact with a conveyor belt, so that as one surface portion becomes worn and unusable, the blade may be rotated to place the other surface portion into engagement with the belt. This design effectively doubles the useful life of the scraper blade assembly.

An advantage of the use of a continuous scraper blade body is that the likelihood of blade chattering is minimized, since there is a single blade contacting the conveyor belt, and that blade is supported securely at its ends by a rigid frame structure. Another advantage of the present invention is that the design can be modified to accomodate blade bodies having different compositions which may be useful in certain selected applications. For example, the blade body may consist of a central portion made of a relatively soft rubber (40 durometer) sandwiched between outer layers of a relatively hard rubber (60 durometer).

The structure of the preferred embodiment possesses an advantage over a comparably shaped blade made of a solid slab of material. If the scraping surface of the latter extruded far enough above the side panels to give reasonable blade life, folding over of the unsupported portion of the blade would occur. In addition a substantial portion of such a blade would be unusable since it would be covered by the side panels.

Accordingly, it is an object of the present invention to provide a conveyor belt scraper blade assembly which is particularly adapted for use with worn conveyor belts having a concave shape; a scaper blade assembly having a continuous belt scraping surface to engage worn belts; and a conveyor belt scraper blade assembly which is relatively inexpensive to manufacture and maintain.

Other objects and advantages of the invention will be apparent from the following description, the accompanying drawings, and the appended claims.

BRIEF DESCRIPTION OF THE DRAWINGS

FIG. 3 is a front elevational view of the scraper blade assembly of FIG. 1; and FIG. 4 is a top view of the scraper blade assembly of FIG. 1.

DETAILED DESCRIPTION OF THE PREFERRED EMBODIMENT

Figure 1:
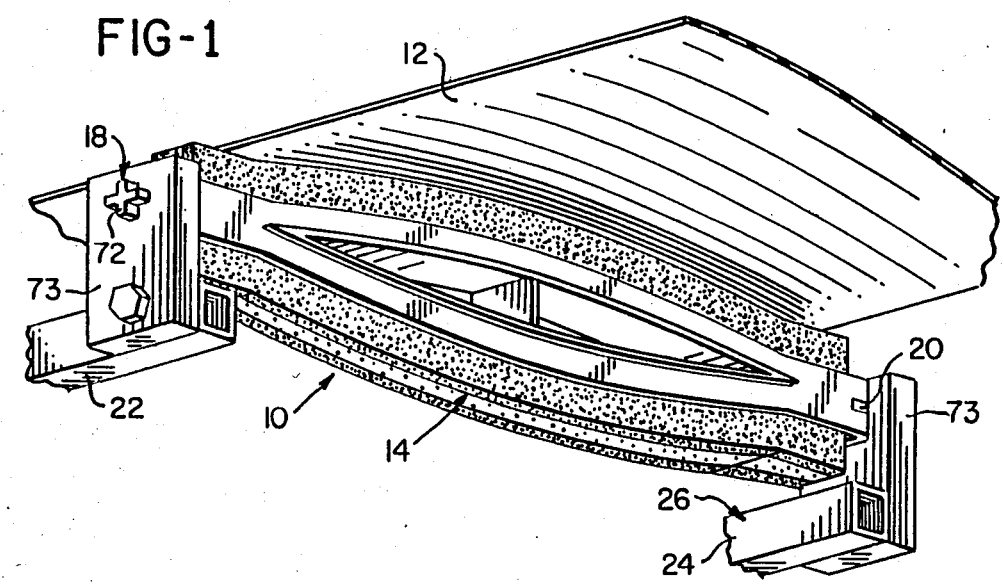
FIG. 1 is a perspective view of a preferred embodiment of the conveyor belt scraper blade assembly of the present invention, shown mounted on supporting structure and engaging a conveyor belt.

As shown in FIG. 1, the coneyor belt scraper blade assembly of the present invention, generally designated 10, is particularly adapted to be used in combination with a worn conveyor belt 12 of the type having a concave contour in a transverse direction. The scraper blade assembly 10 includes an elongate blade body 14, a frame 16, and a pair of brackets 18, 20 which are attached to the frame and are adapted to be attached to the support arms 22, 24 of a supporting structure 26. The supporting structure 26 may be a conveyor belt scraper of the type shown in Stoll U.S. Pat. No. 4,402,394, commonly assigned, the disclosure of which is incorporated herein by reference.

Figure 2:
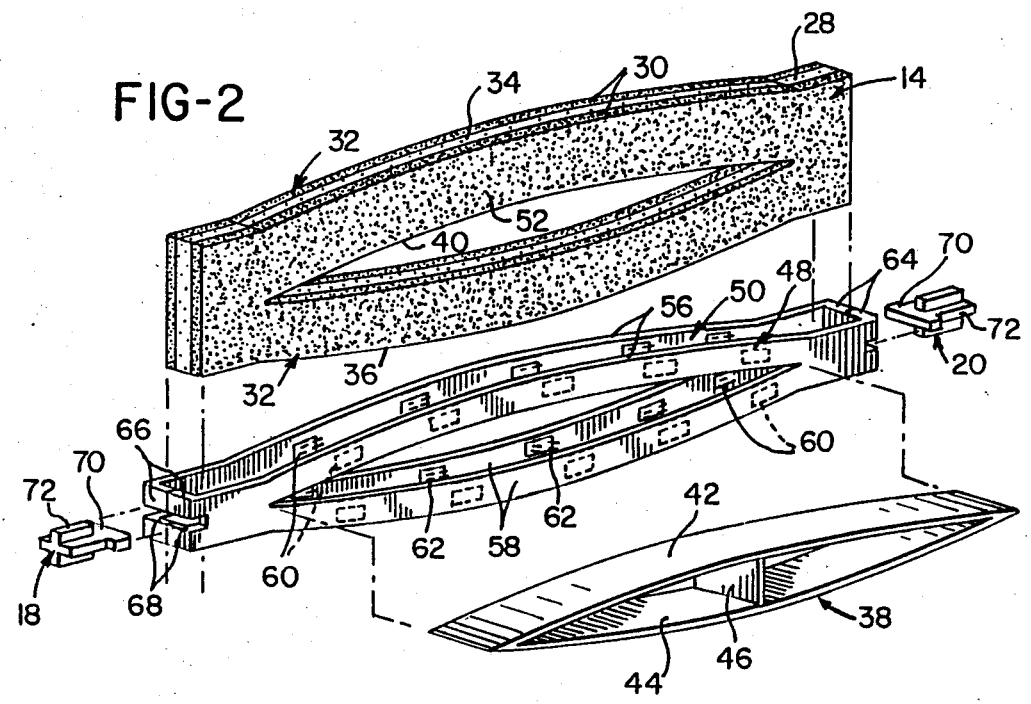
FIG. 2 is an exploded, perspective view of the scraper blade assembly of FIG. 1.

As shown in FIGS. 2, 3, and 4, the blade body 14 is a composite having a central core or plate 28 of a relatively soft material, such as 40 durometer rubber, and outer layers or plastics 30 of a relatively hard material, such as 60 durometer rubber. It is within the scope of the invention to utilize blade bodies 14 made of a urethane or of solid rubber. Depending on the desired application, the rubber could vary from 40 to 90 durometer.

The blade body 14 includes a longitudinally-extending, continuous belt scraping surface, generally designated 32, which comprises a pair of scraping surface portions 34, 36, located on opposite sides of the blade body 14. The scraping surface portions 34, 36 each have a convex shape which matingly engages the concave shape of the conveyor belt 12. That is, the distance from the mid-portion of either scraping surface to a central longitudinal axis A of the blade assembly 10 (see FIG. 3) is greater than the distance of the end portions of the scraping surfaces from the central longitudinal axis.

The convex shape of the scraping surface portions 34, 36 is the result of a double convex insert 38 which is positioned within in a central longitudinal slit 40 formed in the blade body 14. The insert 38 consists of upper and lower bars 42, 44, respectively, welded together at their ends and bowed apart by a central strut 46 welded to the bars.

The frame 16 also includes a pair of side bars 48, 50, which extend along the side walls 52, 54 of the blade body 14. The side bars 48, 50 each include upper and lower arcuate portions 56, 58 that correspond to the double convex contour of the insert 38, so that the insert extends between the arcuate members. The side bars 48, 50, like the insert 38, are made of steel and are welded to the insert to form an integral frame. Gang nail plates 60 are welded to the inside walls of the side bars 48, 50 and are spaced along their lengths. Each nail plate 60 includes inwardly-directed prongs 62 which engage the side walls 52, 54 of the blade body 14 and secure the blade body in position relative to the insert 38.

The side bars 48, 50 include end plates 64, 66 which are bent at right angles to the arcuate members 56, 58 and include cutouts 68 for receiving the end brackets 18, 20. The brackets 18, 20 each include a plate-shaped base 70 and a cruciform extension 72. The bases 70 extend through the openings formed by the engaging cutouts 68 of the end plates 64, 66 and are welded in position.

As shown in FIG. 1, the cruciform extensions 72 are received within correspondingly-shaped openings formed in plate brackets 73 abutted to the support arms 22, 24 of the supporting structure 26. The cruciform shape is symmetrical so that the scraper blade assembly 10 may be positioned to place either of the scraping surface portions 34, 36 into contact with the conveyor belt 12.

In operation, the scraper blade assembly 10 is mounted on the supporting structure 26, and oriented such that the scraping surface portion 34 is urged into the concavity of the conveyor belt 12. The convex shape of the surface portion 34 results in a continuous line of contact with the conveyor belt across its width. When surface 34 is worn, the blade 10 may be rotated 180° about axis A, thereby presenting surface 36 to the belt 12.

While the form of apparatus herein described constitutes a preferred embodiment of the invention, it is to be understood that the invention is not limited to this precise form of apparatus, and that changes may be made therein without departing from the scope of the invention.

What is claimed is:

1. A scraper blade assembly for a conveyor belt comprising:
   an elongate blade body made of a resilient material and having a longitudinally-extending, continuous belt scraping surface and a central longitudinal axis;
   frame means attached to said body for imparting a convex shape to said belt scraping surface such that said surface is at a greater distance from said axis at a mid-portion of said body than at ends thereof; and
   means for attaching said blade assembly to support structure such that said elongate blade body extends transversely of an associated conveyor belt, whereby substantially an entire width of said belt is contacted by said scraping surface.

2. The blade assembly of claim 1 wherein said blade body includes a central, longitudinally-extending slit; and said frame means includes an insert within said slit, said insert imparting said convex shape to said surface.

3. The blade assembly of claim 2 wherein said surface includes a pair of continuous, scraping surface portions on opposing longitudinal sides of said blade body.

4. The blade assembly of claim 3 wherein said insert has a double convex shape such that each of said surface portions has a convex shape.

5. The blade assembly of claim 4 wherein said blade body includes opposing side walls extending between said scraping surface portions, and said frame means includes a pair of side bars, said side bars being connected to said insert and extending along said side walls and supporting said attaching means.

6. The blade assembly of claim 5 wherein said side bars include inwardly-directed prong means for engaging said blade body and holding said body in position relative to said insert.

7. The blade assembly of claim 6 wherein said side bars each include a pair of arcuate members, said arcuate members being shaped to follow an outer contour of said insert, said insert being positioned between said arcuate members and being connected thereto.

8. The blade assembly of claim 7 wherein said attaching means includes a pair of end plates attached to said side panels at ends thereof, said end plates being attachable to a conveyor belt scraper.

9. The blade assembly of claim 1 wherein said blade body comprises a relatively soft inner layer, a portion thereof forming an inner part of said scraping surface, and a pair of relatively hard outer layers sandwiching said inner layer, said outer layers each forming outer parts of said scraping surface.

10. A scraper blade assembly for a conveyor belt comprising:

an elongate blade body made of a resilient material and having a pair of opposing side walls and a pair of continuous scraping surface portions on opposing longitudinal sides thereof, said body including a relatively soft inner layer, a portion thereof forming an inner part of said scraping surface, a pair of relatively hard outer layers sandwiching said inner layer, said outer layers each forming outer parts of said scraping surface, and a central longitudinal slit therethrough;

frame means for imparting a convex shape to said scraping surface portions, said frame means including a double convex-shaped insert positioned within said slit, thereby urging said scraping surface portions outwardly, and a pair of said bars extending along said opposing side walls, said side bars being attached to said insert and each including a pair of arcuate members shaped to follow an outer contour of said insert, said insert being positioned between said arcuate members and being connected thereto;

inwardly-directed prong means attached to said arcuate members for engaging said blade body and holding said blade body in position relative to said insert; and means mounted on said side panels for attaching said blade assembly to support structure to extend transversely of an associated belt.

* * * * *